Jan. 28, 1964    M. B. ROYCE    3,119,214
METHOD OF PACKING APPLES AND THE LIKE IN CONTAINERS
Original Filed Jan. 13, 1960    2 Sheets-Sheet 2
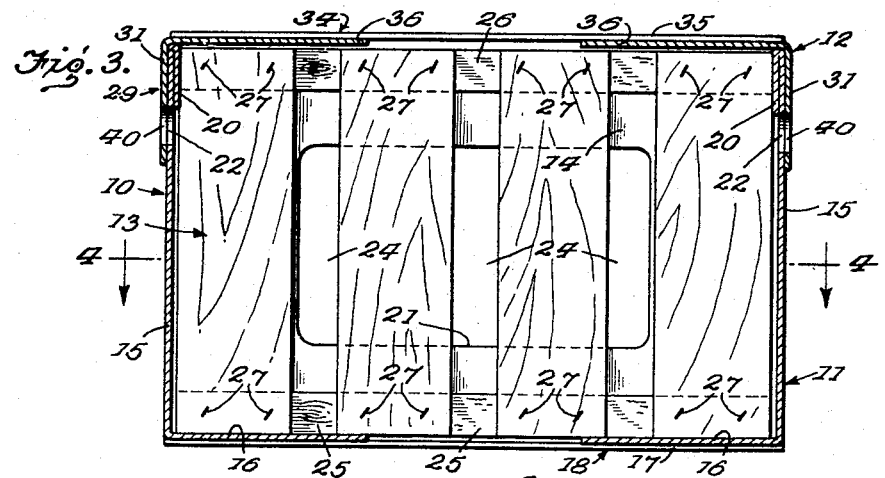
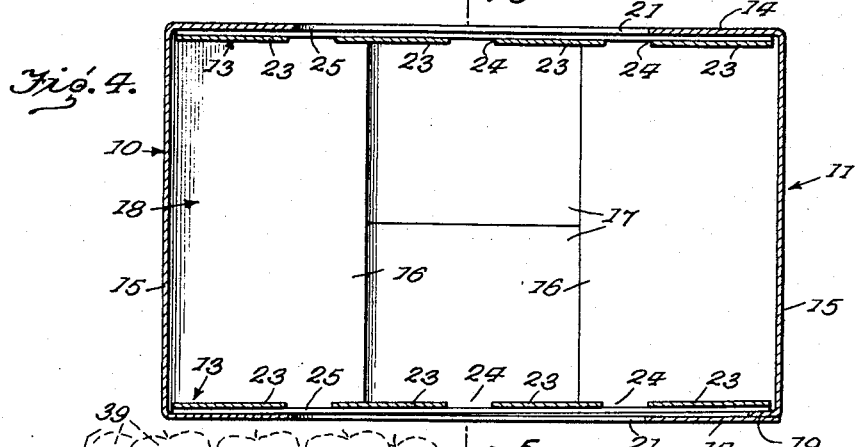
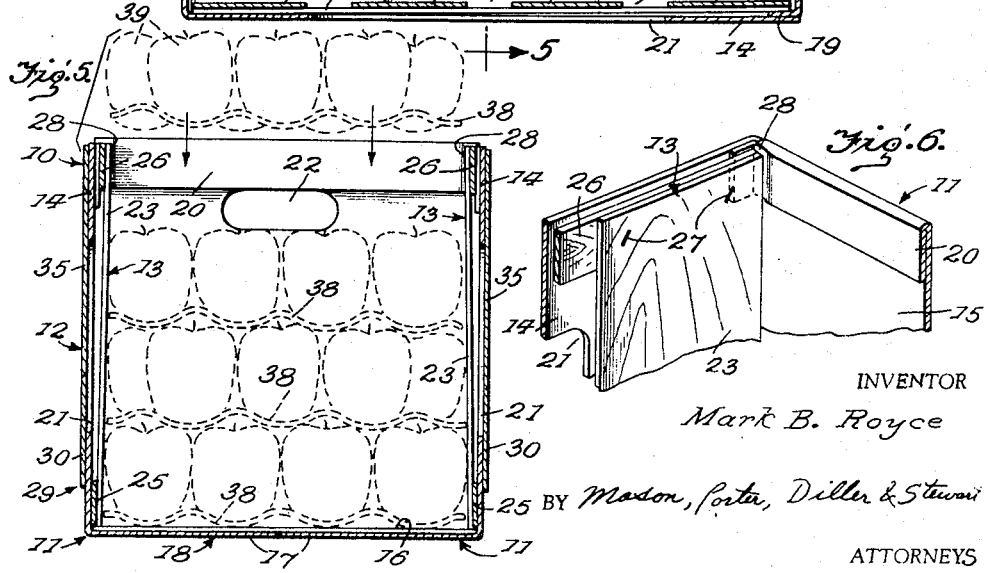
INVENTOR
Mark B. Royce
BY Mason, Porter, Diller & Stewart
ATTORNEYS 3,119,214
METHOD OF PACKING APPLES AND THE LIKE IN CONTAINERS
Mark B. Royce, Hohokus, N.J., assignor to Continental Can Company, Inc., New York, N.Y., a corporation of New York
Original application Jan. 13, 1960, Ser. No. 2,230, now Patent No. 2,973,127, dated Feb. 28, 1961. Divided and this application Dec. 22, 1960, Ser. No. 77,547
4 Claims. (Cl. 53—35)

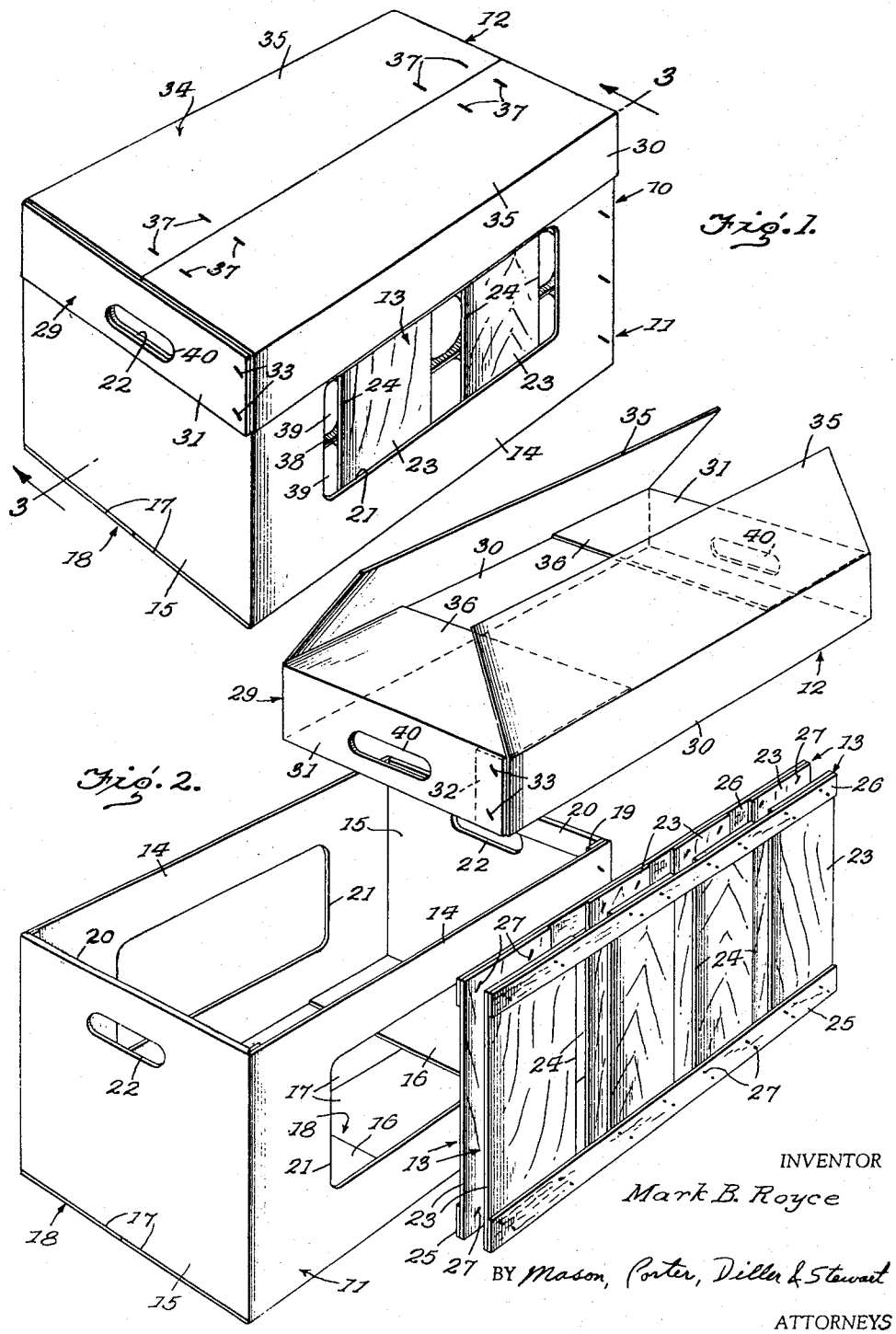

This invention relates in general to new and useful improvements in the container art and more particularly relates to a novel method of packing fruit, such as apples, in containers.

This application is a division of my application Serial No. 2,230, filed January 13, 1960, now Patent No. 2,973,-127, issued February 28, 1961.

Many fruits, particularly apples, are packed in paperboard boxes, with the individual layers of apples being separated by molded pulp trays, much in the same manner as eggs. In the normal packaging of apples, in the packing plant, the apples travel along on a conveyor belt past an operator who picks the apples from the belt and places them in the cavities of the molded pulp trays. The filled trays are dropped into the boxes, and the air in the bottom of the boxes beneath the trays is trapped and functions as a cushion to the descent of the trays of apples. Such a principle has proven to be a very successful one. However, it is also desirable to provide openings in the boxes to permit the circulation of air around the fruit therewithin. The openings, on the other hand, provide a situation wherein the air is no longer trapped beneath the tray as it is lowered into the box, and as a result, the tray falls rapidly to the bottom of the box and the fruit is displaced from the individual pockets of the tray. Further, when additional trays are dropped into the box, if their descent is not cushioned, they will strike the previously positioned fruit and bruise the fruit. For this reason, the present containers for apples and other fruit wherein the fruit is packaged in trays are not provided with the desirable ventilation openings.

It is an object of the invention to provide a novel method of packaging apples and the like, the method including the steps of providing a container having side wall openings therein for ventilating purposes and the like, the container also including a cover which is initially telescoped over the side wall openings to close the same, positioning articles to be packaged on trays of an outline conforming to the general cross-section of the container, lowering the trays into the upper portion of the container and releasing the trays with the trays descending slowly into the container due to the air trapped therebeneath cushioning the descent of the trays, and then moving the cover upwardly to a cover forming position and connecting together previously unconnected top forming flaps of the cover.

Another object of the invention is to provide a novel method of packaging fruit, such as apples, in containers wherein containers including paperboard boxes having large side wall openings therein are provided, the containers also having covers, the method including the step of positioning the cover on the box so as to close the side wall openings, thus forming a box which is relatively sealed, except at the upper end thereof which is open, after which articles packaged in trays having an outline conforming to the cross-section of the box are lowered into the box and the air trapped within the relatively sealed box cushions the descent of the trays.

A further object of the invention is to provide a novel method of cushioning the descent of trays filled with fruit and like articles into ventilated containers, the method including the steps of providing an imperforate cover for each container and prior to the lowering of trays into the container, telescoping the cover down over the box portion of the container to close all ventilated openings in the box, whereby the air disposed in the bottom of the box functions as a cushion for the descending trays.

With the above, and other objects in view that will hereinafter appear, the nature of the invention will be more clearly understood by reference to the following detailed description, the appended claims, and the several views illustrated in the accompanying drawings:

In the drawings:

FIGURE 1 is a perspective view of a container constructed in accordance with the invention and packed with apples.

FIGURE 2 is an exploded perspective view, showing the various components of the container.

FIGURE 3 is an enlarged vertical sectional view taken along the section line 3—3 of FIGURE 1, and shows the specific relationship between the various components of the container, the apples being omitted for purposes of clarity.

FIGURE 4 is an enlarged horizontal sectional view taken along the section line 4—4 of FIGURE 3, and shows further the relationship of the various components of the container.

FIGURE 5 is a transverse vertical sectional view taken along the section line 5—5 of FIGURE 4, and shows still further the details of the container, the positioning of apples both packaged within the container and about to be packaged within the container being shown in dotted lines.

FIGURE 6 is an enlarged fragmentary perspective view of an upper inner corner of the box portion of the container and shows the manner in which one of the inner side members is interlocked with the inturned flap on one of the end walls.

In describing the embodiment of the invention illustrated in the drawings, reference will be made to the packaging of apples therein. It is to be understood, however, that apples are only one of the many articles which may be packaged in containers of the type to which this invention pertains.

In the embodiment of the invention illustrated, the container utilized is generally referred to by the numeral 10. The container 10 is basically formed of a paperboard box, generally referred to by the numeral 11, a paperboard cover, generally referred to by the numeral 12, and a pair of slotted inner side members, generally referred to by the numeral 13. For convenience of shipment, the box 11 and the cover 12 will be shipped in the flat blank state, and the box 11 completely assembled, as is illustrated in FIGURE 2, and the cover 12 only partially assembled, as is illustrated in FIGURE 2.

The box 11 includes a pair of side walls 14 and a pair of end walls 15. The lower edges of the end walls 15 terminate in inturned flaps 16 which overlie inturned flaps 17 integrally connected to the lower edges of the side walls 14. The flaps 16 and 17 are suitably connected together, such as by staples, to form a bottom wall 18 of the box 11. Also, one of the end walls 15 has a narrow vertical flap 19 which is secured to an overlapping portion of one of the side walls 14 to complete the periphery of the box 11.

The upper edges of the end walls 15 terminate in inturned depending flaps 20. These flaps 20 have a dual purpose, as will be described in detail hereinafter.

The side walls 14 are provided with relatively large openings 21. These openings 21 are much larger than the articles to be packaged within the box 11, and are primarily for ventilating purposes, although they will also facilitate the inspection of the articles packaged within the box 11.

Upper portions of the end walls 15 are provided with hand holes 22. As is best illustrated in FIGURE 3, the upper boundaries of the hand holes 22 are disposed flush with the lower edges of the flaps 20. As a result, a two ply grip is provided on the box 11.

The inner side members 13 are of a slatted construction, and each inner side member 13 is formed of a plurality of slats 23 which are vertically disposed and which are spaced apart to provide vertical openings 24. The lower ends of the vertical slats 23 are connected together by a horizontal slat 25. A second horizontal slat 26 extends between and connects the upper edges of the slats 23. If desired, staples, such as the staples 27, may be used for securing the slats together.

Each of the inner side members 13 is of a length slightly greater than the initial spacing between the flaps 20. As a result, when the inner side member 13 is positioned within the box 11, the ends of the flaps 20 are crushed to form a vertcial recess 28, best illustrated in FIGURE 6. The upper corners of the inner side members 13 being disposed within the recesses 28, the inner side members 13 are locked in place within the box 11. It is to be noted that the openings 24 are aligned generally with the large openings 21 and thus in effect restrict the size of the large openings 21.

The cover 12 is of a similar construction to the box 11, and includes a body portion, generally referred to by the numeral 29, the body portion 29 being formed by a pair of cover side walls 30 and a pair of cover end walls 31. One of the cover side walls 30 is provided with a flap 32 on the end thereof, which flap 32 underlies one of the cover end walls 31 and is secured thereto by staples 33.

The cover 12 also includes a top wall 34. The top wall 34 is formed by a pair of flaps 35 which are extensions of the cover side walls 30, and a pair of flaps 36 which are extensions of the cover end walls 31, the flaps 36 underlying the flaps 35 and being secured thereto by staples 37, as is best illustrated in FIGURE 1.

At the beginning of the packaging operation, the container 10 is assembled, as is best illustrated in FIGURE 5. In this container, the inner side members 13 are disposed within the assembled box 11, and the body portion 29 of the cover 12 has been assembled, but the flaps 35 and 36 are still free. The cover 12 is telescoped down over the box 11 with the body portion 29 and the flaps 35 and 36 engaging respective ones of the side walls and end walls of the box 11 to close the openings 21. Thus, the container 10 is provided in its complete condition ready to be filled and closed. The container 10 assembled as described above, is suspended from a hook member in the packing house and travels along on a conveyor in front of the packers. When a container is needed, the packer merely reaches up, grabs off a container, and has in one assembly the two piece container, that is, the box and the cover, plus the slatted inner side members.

In the packing plant, apples travel along on a conveyor belt past an operator who picks up the apples from the belt and places them in cavities of a molded pulp tray, such as the pulp trays 38 illustrated in FIGURE 5. When the tray 38 is filled with apples 39, it is then dropped into the box 11 Thus air within the box 11 is trapped beneath the tray 38, which tray has an outline corresponding to the general cross section of the box 11, and cushions the descent of the tray, descending gradually as the air escapes. The air escapes around the edges of the tray and through the spacing between the flaps of the inner side members 13. If the cover 12 were not in place over the openings 21, the air would escape through the openings 21 too quickly to support the tray of apples, with the result that the tray of apples would rapidly descend into the box 11. Such rapid rate of descent, coupled with the sudden stopping of the tray at the bottom of the box 11, would result in the apples 39 being displaced from their respective cavities in the tray 38. Furthermore, the loaded tray 38 striking a lower tier of apples would result in the bruising of such apples.

After the required number of trays of apples are positioned within the box 11, the cover 12 is moved upwardly and the flaps 35 and 36 are stapled together, as is best illustrated in FIGURE 1. At this time, the package is complete.

It is to be noted that the cover end walls 31 are also provided with hand holes 40. The hand holes 40 are so positioned within the cover end walls 31 that they are aligned with the hand holes 22. Thus, as is best illustrated in FIGURE 3, a three ply grip is provided for the finished package.

In the finished package, the openings 21 are partially closed by the slats 23 of the inner side members 13 and the aligned openings 21 and 24 permit the necessary circulation of air between the individual pieces of fruit within the container 10 to prevent spoilage. Also, a limited inspection may be had through the openings in the inner side members 13. The inner side members 13 have an additional function, in that they are of sufficient vertical rigidity to reinforce the containers 10 against crushing. This is highly desirable in that when the containers 10 are stored in their packaged state, they are placed one on top of the other.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

I claim:

1. A method of packaging articles in a container of the type having wall openings and a cover having free end flaps and a tubular body portion carrying the end flaps, the method comprising the steps of telescoping the cover over the container with the cover being open at the top thereof to provide free access to the interior of the container and the cover closing the container wall openings to restrict the flow of air therethrough, providing articles positioned on trays of a size conforming to the general cross-section of the container, positioning individual ones of the trays in the upper portion of the container and releasing the trays with the air trapped within the container below the trays cushioning the descent of the trays, elevating the cover to clear the container wall openings, and securing together the cover free end flaps to close the top of the container.

2. A method of packaging articles in a container of the type having large wall openings and a cover having free end flaps and a tubular body portion including side walls carrying the end flaps, the method comprising the steps of providing inner side members having smaller openings therein and positioning the inner side members within the container alongside the container side walls with the smaller openings facing the large openings, telescoping the cover over the container with the cover body being open at the top thereof to provide free access to the interior of the container and the cover closing the container wall openings to restrict the flow of air therethrough, providing articles positioned on trays of a size conforming to the general cross-section of the container, positioning individual ones of the trays in the upper portion of the container and releasing the trays with the air trapped within the container below the trays cushioning the descent of the trays, elevating the cover to clear the container wall openings, and securing together the cover free end flaps to close the top of the container.

3. A method of packaging articles in a container of the type having wall openings and a cover having free end closures and a tubular body portion, comprising the steps of positioning the cover in a partially formed condition on the container with the cover overlying and temporarily covering the wall openings to restrict the flow of air through the wall openings and with the cover in an out-of-the-way position relative to the upper end of the container and providing free access to the interior of the container from the top thereof, providing trays of articles wherein the trays are of a size conforming to the general cross-section of the container, positioning individual ones of the trays in the upper portion of the container and releasing the trays with the air trapped within the container below the trays retarding the descent of the trays, and then moving the cover to a position to clear the wall openings and finishing the forming of the cover to close the top of the container.

4. A method of packaging articles in a container of the type having wall openings and a cover, comprising the steps of temporarily covering the wall openings by temporarily positioning the cover over the wall openings, providing the articles to be packaged positioned on trays of a size conforming to the general cross-section of the container, positioning individual ones of the trays in the upper portion of the container and releasing the trays with the air trapped within the container below the trays cushioning the descent of the trays, and then uncovering the wall openings.

References Cited in the file of this patent
UNITED STATES PATENTS

| | | |
|---|---|---|
| 2,453,574 | Hill | Nov. 9, 1948 |
| 2,797,540 | Carlsen et al. | July 2, 1957 |
| 2,864,545 | Royce | Dec. 16, 1958 |